United States Patent [19]

Adachi

[11] Patent Number: 4,600,192
[45] Date of Patent: Jul. 15, 1986

[54] HOCKEY STICK MANUFACTURE

[76] Inventor: Yutaka Adachi, 77 Saskatoon Drive, Weston, Ontario M9P 2G1, Canada

[21] Appl. No.: 619,320

[22] Filed: Jun. 11, 1984

[51] Int. Cl.⁴ .............................................. A63B 59/14
[52] U.S. Cl. .................. 273/67 A; 156/173; 156/184; 156/194; 156/245
[58] Field of Search ............. 156/173, 184, 189, 194, 156/245, 156; 273/67 A

[56] References Cited

U.S. PATENT DOCUMENTS

| 3,974,012 | 8/1976 | Hogarth | 156/173 |
| 4,086,115 | 4/1978 | Sweet et al. | 273/67 A |
| 4,488,721 | 12/1984 | Frank et al. | 273/67 A |

FOREIGN PATENT DOCUMENTS 611163 12/1960 Canada .
896690 3/1972 Canada .
1158912 1/1983 Canada .

Primary Examiner—Caleb Weston
Attorney, Agent, or Firm—Donald E. Hewson

[57] ABSTRACT

The method disclosed is for making hollow-handled sticks in fibre-reinforced plastic. The method is to mould the stick handle in moulds that run the full length of the handle. The moulds comprise a core and a channel. A resin-and-fibre mat is squeezed between the core and the channel. The hollow handle can be formed either by glueing two U-shaped components (15,16) together one inside the other or by wrapping the mat (27) around a mandrel (24), in which case the mandrel is withdrawn lengthwise after curing. The stick blade (29) may itself be inserted in the channel (25) in which case the mat of the handle may be arranged to enwrap the blade.

9 Claims, 8 Drawing Figures

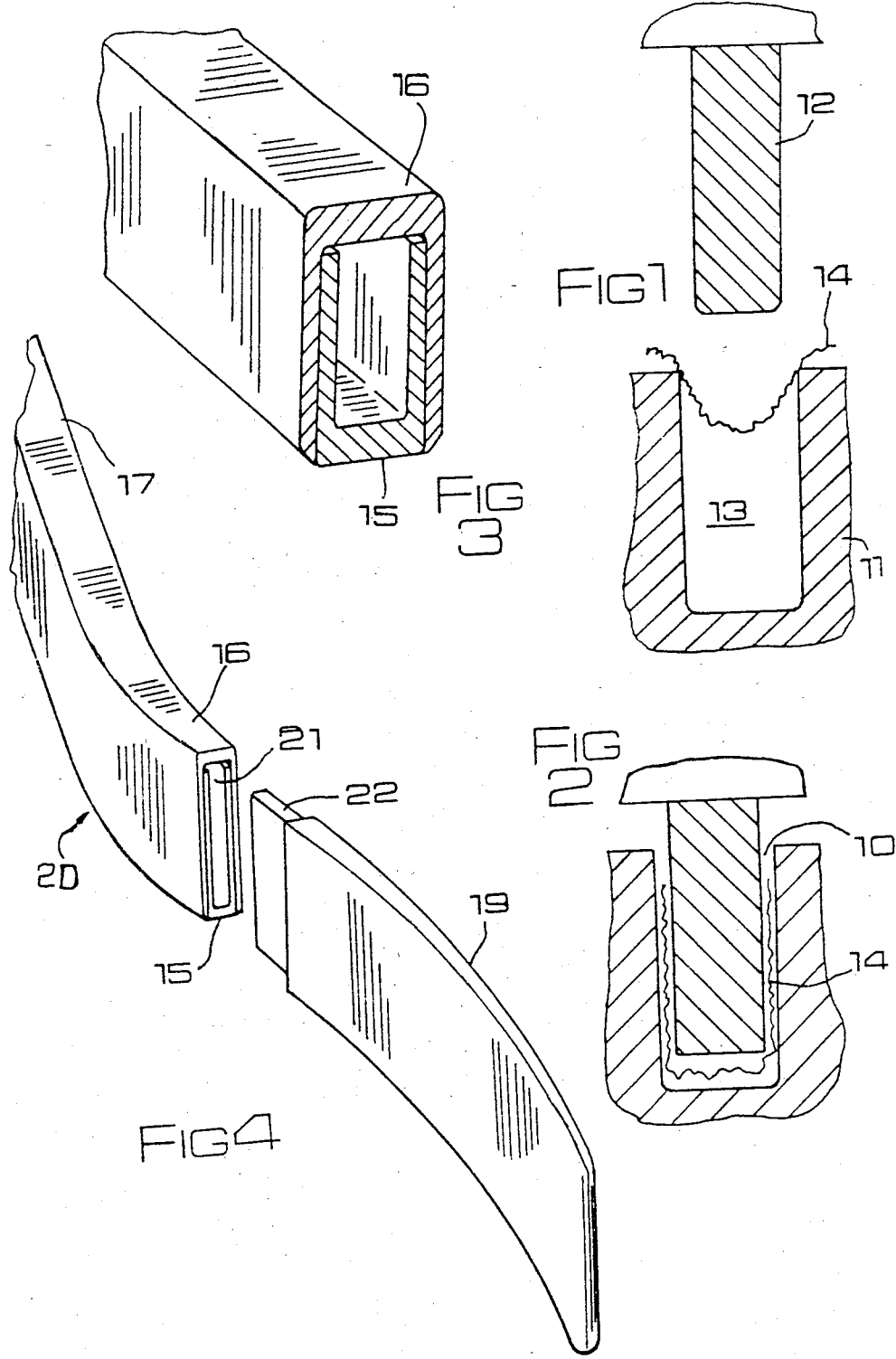

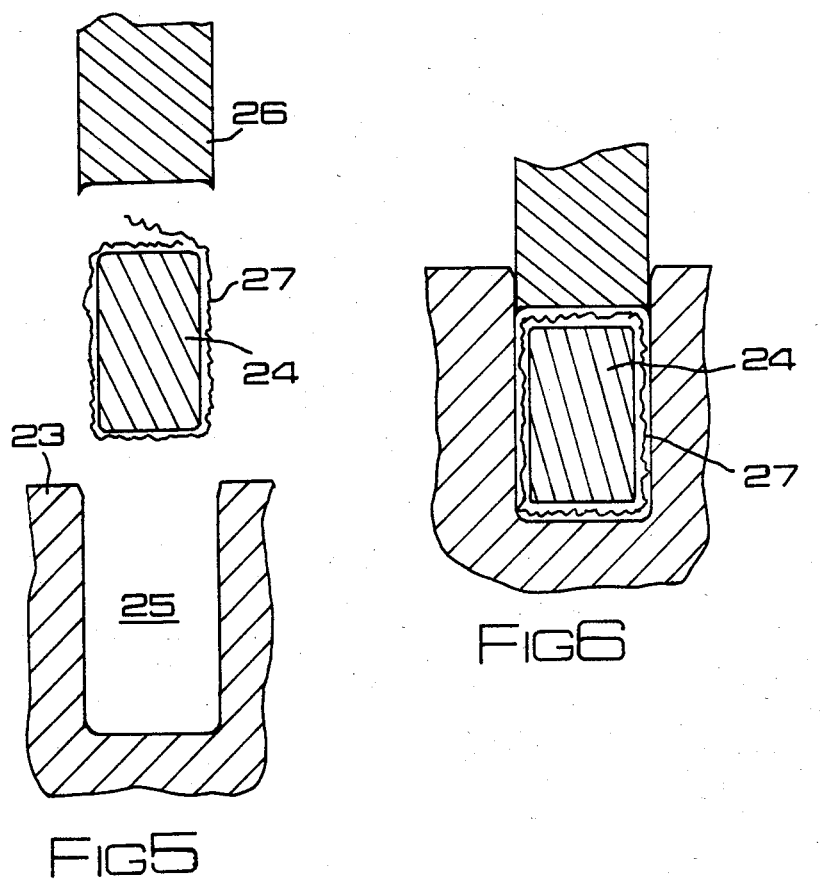

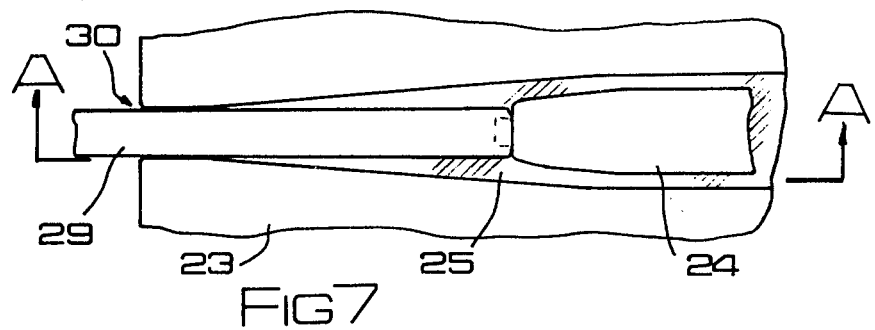
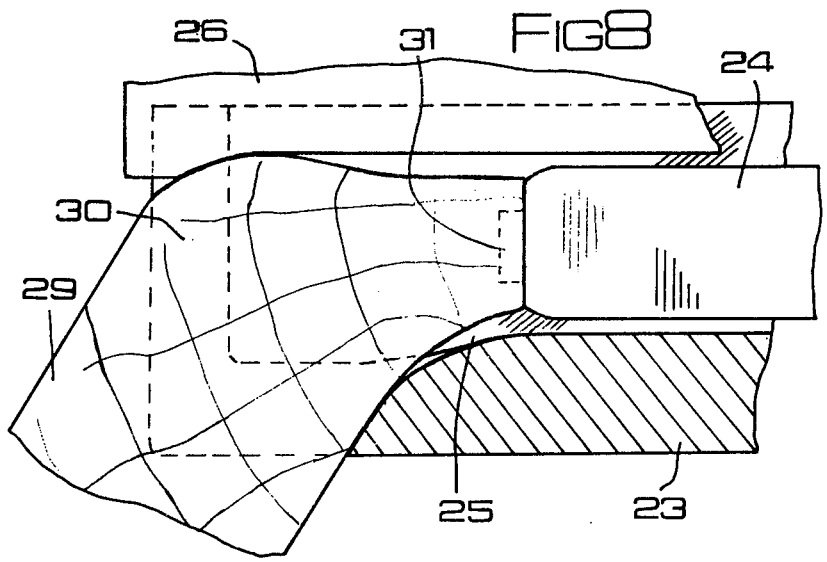

HOCKEY STICK MANUFACTURE

This invention relates to the manufacture of hockey sticks.

The traditional material for hockey sticks is wood, and the sticks are made by glueing a wooden blade to a wooden handle. The joint is spliced and carefully made so that usually the joint is not the first area to fail if the stick is subjected to abuse.

However, wood is expensive, and a good deal of production quality control is needed if the joint is to be consistently reliable. Also, wood spinters when it breaks. Many injuries have been caused by the splintered ends of broken sticks.

PRIOR ART

Attempts have been made therefore to provide hockey sticks in plastic materials. In Canadian Pat. No. 873,488 (issued June 15, 1971 to FRANCK) a stick handle is made by winding fibres over a mandrel and setting those fibres in resin, which is left to cure.

In U.S. Pat. No. 4,086,115 (issued Apr. 15, 1978 to SWEET) a stick handle is made by an extrusion or drawing process, termed pulltrusion. This is a generally continuous process for making hollow sections in glass fibre reinforced plastic.

The manner of attaching blades to handles has been the subject of a number of previous proposals, and besides the above the following patents are typical of those that contain relevant teachings:

U.S. Pat. No. 3,961,790—June 8, 1976, MILLIGAN
U.S. Pat. No. 3,934,875—Jan. 27, 1976, EASTON
U.S. Pat. No. 4,369,970—Jan. 25, 1983, SALMINEN
U.S. Pat. No. 4,358,113—Nov. 9, 1982, McKINNON All of these previous proposals have involved compromise. It is the aim of the invention to provide a manner of manufacturing hockey sticks in fibre-reinforced plastic material in which all the important aspects of performance can be maximized together, without undue expense.

BRIEF DESCRIPTION OF THE INVENTION

In the invention, the handle is moulded in elongate moulds. A channel as long as the handle is formed in one mould and the resin-impregnated fibres (in mat form) are laid over or in the channel. A core presses the mat into the channel, along the full length of the channel. (The term "mat" as used in this specification should not be construed as referring only to the kind of mat commonly called "chopped strand mat" in fibre plastic technology. The term generically includes chopped strand mat, woven-roving mat, and other styles in which the filaments or fibres are arranged in mat form.)

As will be described later, the handle can either be made as two U-shaped sections which are glued together, or the handle can be made as a single section wrapped around a mandrel, which is later removed after the resin has cured. In either case, the benefits of the core-within-a-channel manner of moulding the handle has these benefits:

(1) The section of the handle can be varied. The main length of the handle can be the traditional rectangular section that is favoured by players, while the lower end of the handle can be shaped to the most advantageous and strongest profile to receive the blade. This ability for the section to be changed according to the requirements of the different regions of the handle may be contrasted with the very limiting restrictions of a handle formed by an extrusion process.

(2) The fibres may be laid in the proportions for the best performance balance. The ratio of the fibres laid lengthwise to those laid hoop-wise can be adjusted, not only handle-to-handle, but at different locations on the one handle. The wall thickness of the handle also may be easily adjusted for the best results.

(3) The outside surface of the handle is smooth. This surface is derived from that of the mould; virtually no finishing is needed, other than trimming at the mould parting-line. Good dimensional repeatability is achieved. The external corners may be of small-radius (as they are in wooden handles).

(4) The handle is hollow, and the walls may be relatively thin yet strong, so that the handle itself is light.

(5) The manner of making the sticks is simple yet also efficient, as will be described below. Very little hand work is required.

In an embodiment of the invention, the operation of making the handle and of attaching the handle to the blade are carried out simultaneously. This is extremely economical and provides a very strong hockey stick.

The blade of the stick may be made itself of fibre-reinforced plastic, or it may be of wood, or may be a plastic injection-moulding.

DETAILED DESCRIPTION OF PREFERRED EMBODIMENTS

FIGS. 1 and 2 are cross-sections of press-moulds at different stages of closure;

FIG. 3 is a cross-section of a hockey stick handle;

FIG. 4 is a view of a hockey stick during construction;

FIGS. 5 and 6 correspond to FIGS. 1 and 2 but show other press-moulds;

FIG. 7 is a plan of a mould during manufacture of a hockey stick;

FIG. 8 is a cross-section on line A—A of FIG. 7.

FIG. 1 shows a pair of complementary moulds for use in a press. A channel-shaped lower die 11 and a core 12 are mounted respectively in the relatively movable parts of the press. When the press closes, the core 12 enters the channel 13 of the channel-shaped die 11. The channel 13 extends in an elongate manner at right angles to the plane of the figure.

In FIG. 2, the press has closed, and the core has entered the channel to such a degree as will leave a clearance 10 between the core and the channel.

A length of resin-impregnated matting 14 of glass fibres is placed over the die 11, and becomes trapped between the core 12 and the channel 13 when the press is closed. The core 12 may be clamped to the die 11, and the core and die then removed from the press while the resin cures, or the moulds may be left in place in the press while the resin cures.

When the resin is cured, the core 12 is removed from the channel 13, either by simply lifting the core out, or by sliding the core lengthwise along the channel. The cured resin mat is then removed from the channel.

The elongate piece 15 of cured resin, refinforced with the glass fibres, is U-shaped in cross-section. The piece 15 will form part of the handle of the hockey stick. Another such U-shaped piece 16 is prepared in the same manner, except that the overall width of the section of one piece 15 is dimensioned to fit tightly between the arms of the U of the other piece 16.

The two pieces 15,16 are glued together along their length so as to form a hollow rectangular tube, which will be the handle 17 of the hockey stick, as shown in FIG. 3.

The U-section of the pieces 15,16 is uniform throughout most of the length of the handle. Towards the bottom of the handle 17 the pieces are tapered: the handle becomes less in thickness in that it tapers down to the slimness of the blade 19 of the stick, but the handle 17 also increases as to its vertical height in that the height tapers out to that of the blade 19. This aspect may be seen in FIG. 4.

The hollow interior of the handle 17 is open at the very bottom of the handle, and comprises a slot 21. The blade 19 is provided with a spigot 22, which is shaped to fit the slot 21. The spigot 22 is glued into the slot 21 to attach the blade to the handle. The transition between the handle section and the blade section of the handle is done at the bend 20 of the stick. As may be seen in FIG. 4, the angle at which the blade spigot enters the slot is substantially inclined to the length of the handle, which provides a good strong joint.

FIGS. 5 to 8 show another manner of manufacturing hockey sticks. Again, the lower die 23 of the press is channel shaped. The core 24 is not now mounted for movement with the press, but takes the form of a mandrel which is adapted to lie in the channel 25. A plunger 26 moves downwards into the channel when the press closes, and the arrangement is such that a clearances is left all round the core 24.

To make a handle, a piece of matting 27 is wrapped around the core 24, the edges being overlapped on top of the core. The wrapped core is then squeezed in the press.

The bottom end of the core 24 is located in the channel 25 in the manner shown in FIGS. 7 and 8. With the press open, the blade 29 of the stick is fitted tightly into a slot 30 in the die 23. The fit is such that the blade 29 is firmly held in the die 23, and such that resin in the channel 25 is contained against leakage between the sides of the slot 30 and the sides of the blade 29. The core 24 fits onto a spigot 31 of the blade 29, so that the core is held in place by the blade.

Wrapping the core 24 in the mat 27 is done so as to leave a portion of the mat extending beyond the core. This portion then enwraps the blade 29.

Such a joint is very strong. Yet it was formed at the same time as the handle was made. The savings in production costs are substantial. The mat covers and extends over the whole joint area, providing a robust, rigid bridge between the handle and the blade.

When the resin has cured, the core or mandrel 24 can be removed from the inside of the handle: the core of course was coated with release agent prior to being wrapped, and also the core has a slight draft angle to ease removal.

The mat used to make the handle may be chopped strand mat, or it may be woven-roving mat. Preferably, however, the mat is made by arranging the fibres in a manner especially applicable to the invention.

The fibres are provided as a continuous roving, a roving being a loosely packed (not twisted) bundle of filaments some 3 mm wide and around 0.2 mm thick. The roving is cut into lengths as long as the handle, and the lengths are laid beside each other, either in the channel, or on a sheet of plastic draped over the channel. This is done with the roving in a dry state. The lengths are packed tightly together to form a dense mat. The mat may be just one roving thick, or it may be two or more rovings thick.

Resin is poured over the mat, and the mat pressed in the press as described above. The degree of compression is set so that the resin penetrates into all spaces and interstices and thoroughly wets the fibres, as known per se in the art.

Arranging the roving in this manner is suitable when the lengths of roving are disposed along the length of the stick or at a slight angle thereto. The roving may be arranged in a hoop disposition by winding the roving around the mandrel. Again, one mat may be formed in this manner, or several hoop-shaped mats may be formed, one over the other.

When plural thicknesses of roving are provided, the fibres may be of different materials, to achieve a desired balance of strength and economy. The fibers may be for example all of glass, or they may all be carbon fibres. Or, the mat may be arranged in layers of alternating materials. Pigment may be added to the resin, as desired.

Not only does the invention provide a very strong yet economical stick, it allows the stick to be of the familiar rectangular shape. The corner radius of the rectangle can be as sharp as the radius on the corresponding wooden handle. The sharpness of the corner is limited by the tendency of a sharp corner to be easily chipped in use, not by any restrictions imposed by the method of manufacture.

I claim:

1. Method of making a hockey stick from fibre-reinforced plastic material;
   wherein the hockey stick has a handle, a blade, and a transition portion;
   where the cross-sectional profile of the handle is different from the cross-sectional profile of the blade both in breadth and thickness;
   and where the cross-sectional profile of the transition portion changes smoothly and progressively from the profile of the handle to the profile of the blade;
   where the method includes the steps of:
   providing a press, and moulds for the press which include a channel-shaped die having a channel, and a core formed as a mandrel;
   moudling at least a portion of the stick to shape in the said moulds;
   providing a mat of fibre reinforcing material, wrapped around said core with the edges being overlapped, and impregnating said mat with resin;
   compressing the impregnated mat between the core and the channel by a plunger;
   and maintaining the core and channel relatively stationary until the resin has cured;
   where the portion of the stick that is moulded to shape in the moulds includes the handle and at least a part of the transition portion; and
   wherein the mandrel is located with respect to the channel by engaging the mandrel to the blade of the hockey stick, and by engaging the blade in the die.

2. Method of claim 1, where the core is removed from the moulded portion of the stick, after the resin has cured.

3. Method of claim 1, comprising the further steps of:
   after the resin has cured, withdrawing the plunger from the channel, and withdrawing the mandrel lengthwise with respect to the stick handle, thereby to provide a hollow interior for the handle.

4. Method of claim 1 comprising the steps of:

forming the blade (29) of the hockey stick with a means (31) to receive the mandrel (24), and engaging the mandrel therewith;

where not only the mandrel but also the area of engagement between the mandrel and the blade, and at least a part of the transition portion contiguous with the area of the of the engagement are enwrapped with said mat of fibre reinforcing material;

then engaging the blade (24) with the die (23,30);

and, after the resin has cured, disengaging the mandrel from the blade, and withdrawing the mandrel lengthwise from the interior of the stick handle.

5. Method of making a hockey stick from fibre-reinforced plastic material;

where the hockey stick has a handle, a blade, and a transition portion;

where the cross-sectional profile of the handle is different from the cross-sectional profile of the blade both in breadth and thickness;

and where the cross-sectional profile of the transition portion changes smoothly and progressively from the profile of the handle to the profile of the blade;

where the method includes the steps of:

providing a press having relatively moveable components which come together when the press closes; and moulds for the press which include a channel-shaped die having a channel, and a core, mounted respectively to said relatively moveable components;

the lengths of the channel and of the core being parallel to each other and perpendicular to the direction of closure of the press so that the core moves into the channel as the press closes;

moulding at least a portion of the stick to shape in the said moulds;

providing a mat of fibre reinforcing material positioned between the channel and the core, and impregnating said mat with resin;

compressing the impregnated mat between the core and the channel;

and maintaining the core and channel relatively stationary until the resin has cured so as to form a first elongated component of U-shaped section;

making a second elongated component of U-shaped section, dimensioned so that the overall width of the section of one of said first and second elongated components is substantially the same as the distance between the arms of the U-shaped section of the other of said elongated components;

and securing said first and second elongated components together one inside the other so as to form an enclosed hollow tube, to comprise together the handle and at least a part of the transition portion of the stick.

6. Method of claim 5, where the hollow interior of the transition portion comprises a slot (21) for receiving the blade (19) of the stick, and where the blade is provided with a spigot (22) for engagement in the slot.

7. Method of claim 6, where the two components of the handle are so shaped that the transition portion is at the bend (20) of the hockey stick, and where the spigot (22) enters the slot (21) at a substantial angle to the longitudinal axis of the handle.

8. A hockey stick that has been manufactured by the method of claim 1.

9. A hockey stick that has been manufactured by the method of claim 5.

* * * * *